Figure 1:
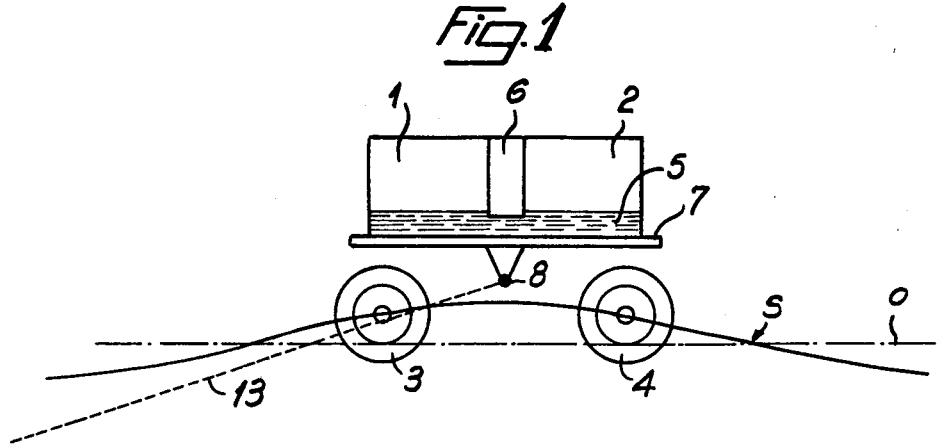

United States Patent [19]

Scarpi

[11] 4,207,739

[45] Jun. 17, 1980

[54] PROCESS AND APPARATUS FOR HARNESSING THE ENERGY OF THE SWELL

[76] Inventor: Bruno D. Scarpi, Kerventec-Penthièvre, Saint-Pierre de Quiberon, Morbihan, France

[21] Appl. No.: 860,693

[22] Filed: Dec. 15, 1977

[30] Foreign Application Priority Data

Dec. 22, 1976 [FR] France ............................... 76 38679

[51] Int. Cl.² ........................................... F03B 13/12
[52] U.S. Cl. .................................... 60/398; 60/497; 60/495; 60/500; 60/501
[58] Field of Search ........................... 290/42, 43, 53; 60/495–507, 398; 417/331

[56] References Cited

U.S. PATENT DOCUMENTS

| 861,997 | 7/1907 | Luck | 60/501 |
|---|---|---|---|
| 875,042 | 12/1907 | Bissell | 60/495 |
| 1,448,029 | 3/1923 | Larry et al. | 290/42 |
| 4,009,396 | 2/1977 | Mattera et al. | 290/53 |

FOREIGN PATENT DOCUMENTS

| 115660 | 8/1941 | Australia | 60/501 |
|---|---|---|---|
| 43-19285 | 3/1968 | Japan | 290/53 |
| 1492427 | 3/1975 | United Kingdom | 290/53 |

*Primary Examiner*—Allen M. Ostrager
*Attorney, Agent, or Firm*—Christel, Bean & Linihan

[57] ABSTRACT

Process for harnessing the energy of the natural movements of a heaving liquid mass including the following steps: providing a vessel floating on said liquid mass, the vessel having a compartment containing an auxiliary liquid; allowing the vessel to follow the natural movements of the heaving liquid mass thereby causing reciprocating motion of said auxiliary liquid; and translating the energy developed by the reciprocating motion of said auxiliary liquid into electrical energy. Apparatus for implementing the said process including a vessel suitable for floating on a heaving liquid mass, and having at least one compartment for receiving an auxiliary liquid; and means for translating into electrical energy the energy developed by reciprocating motion of said auxiliary liquid caused by the vessel following the natural movements of the heaving liquid mass.

19 Claims, 24 Drawing Figures

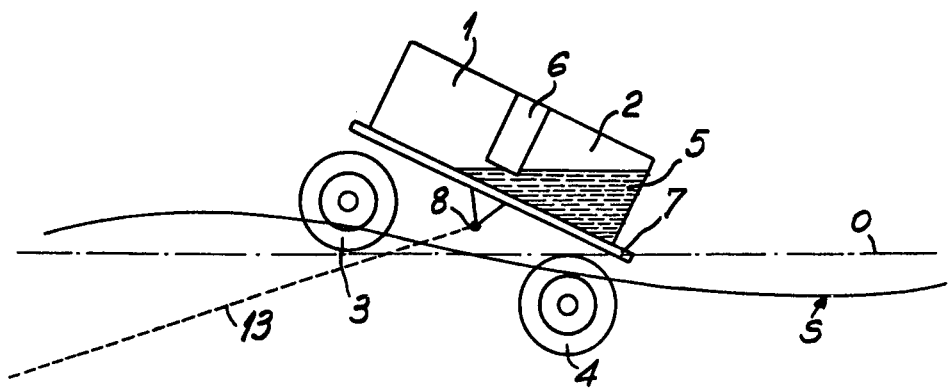
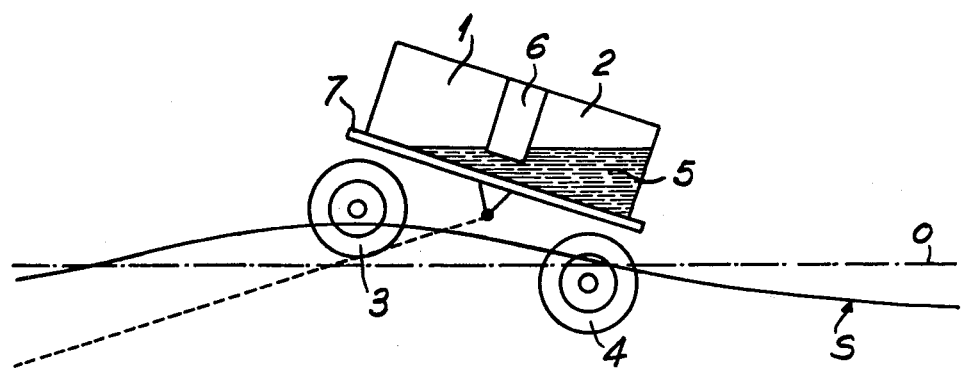
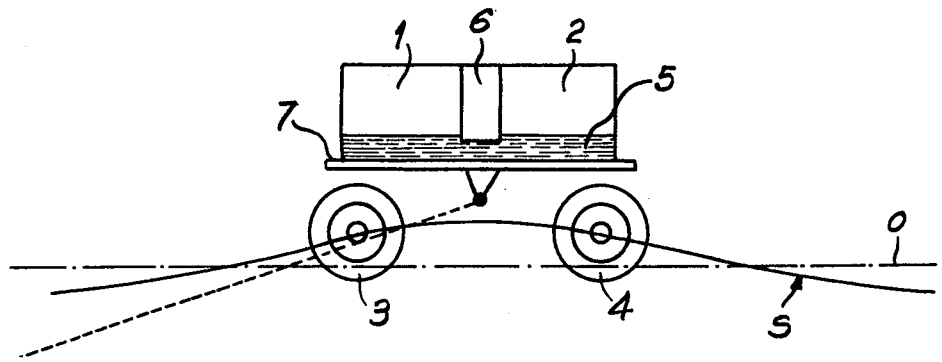

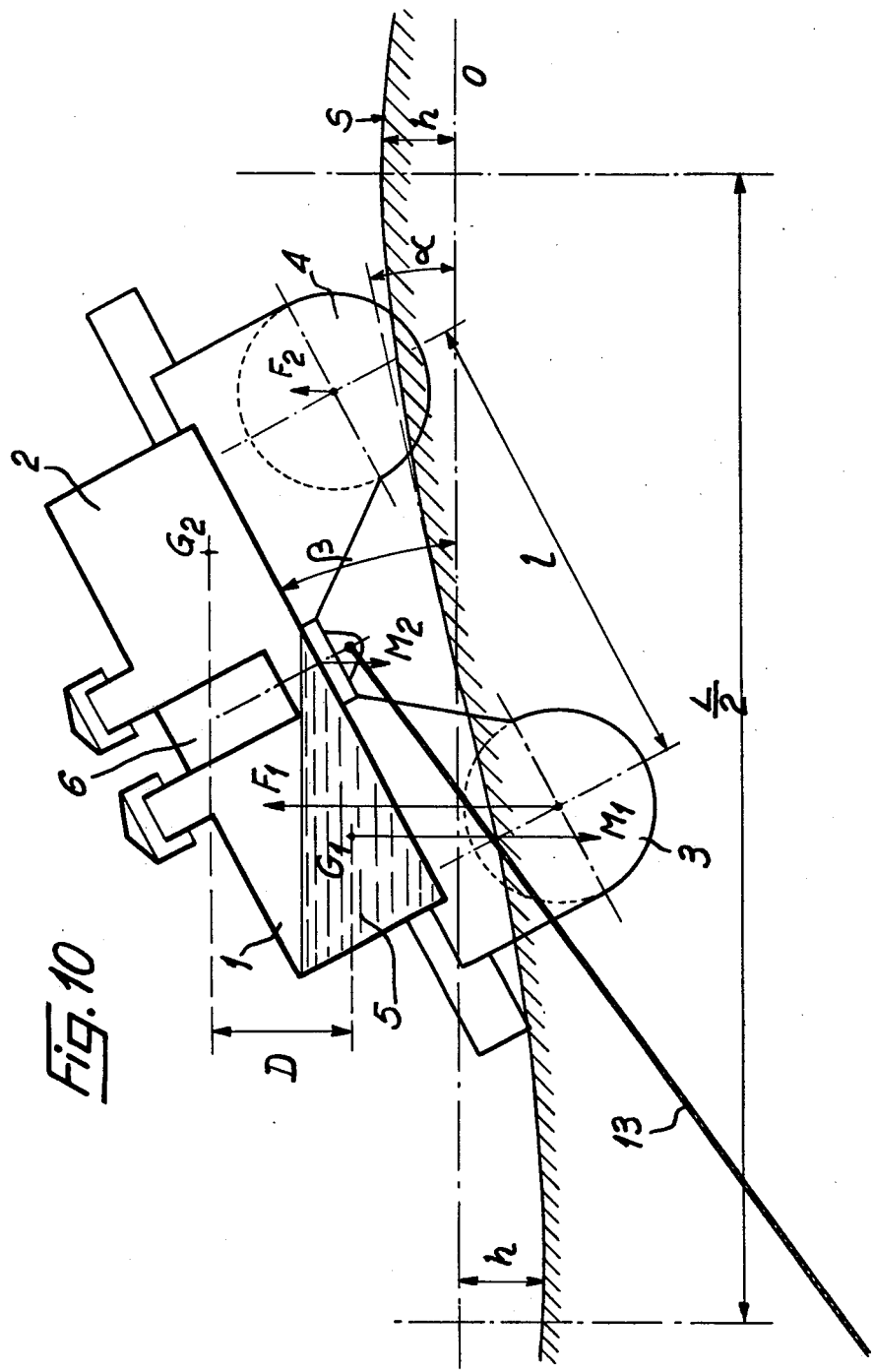

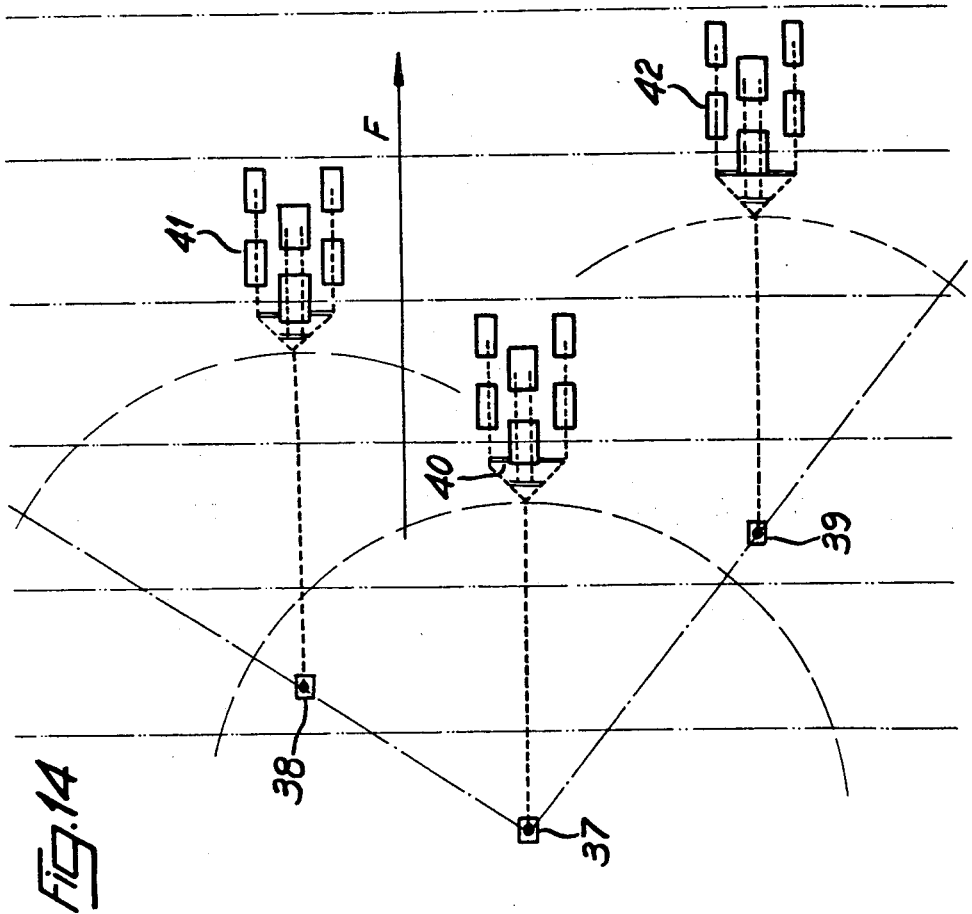

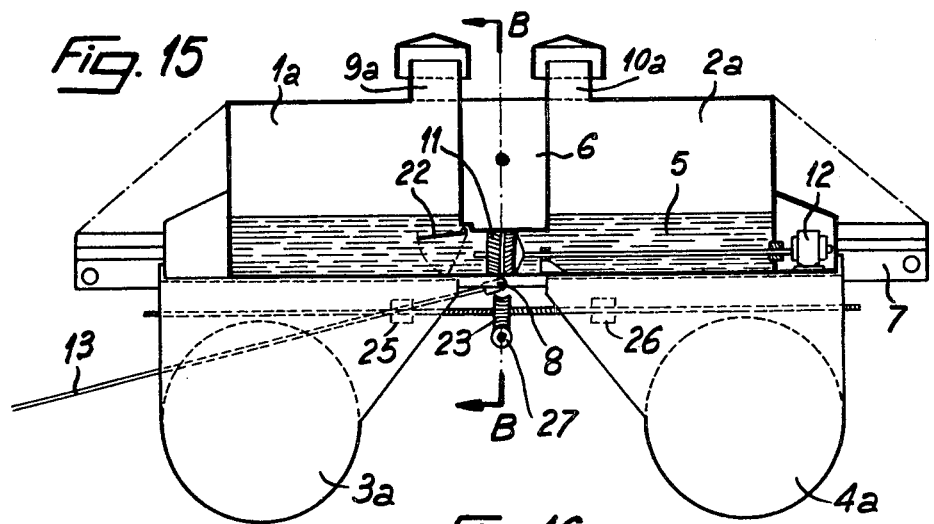
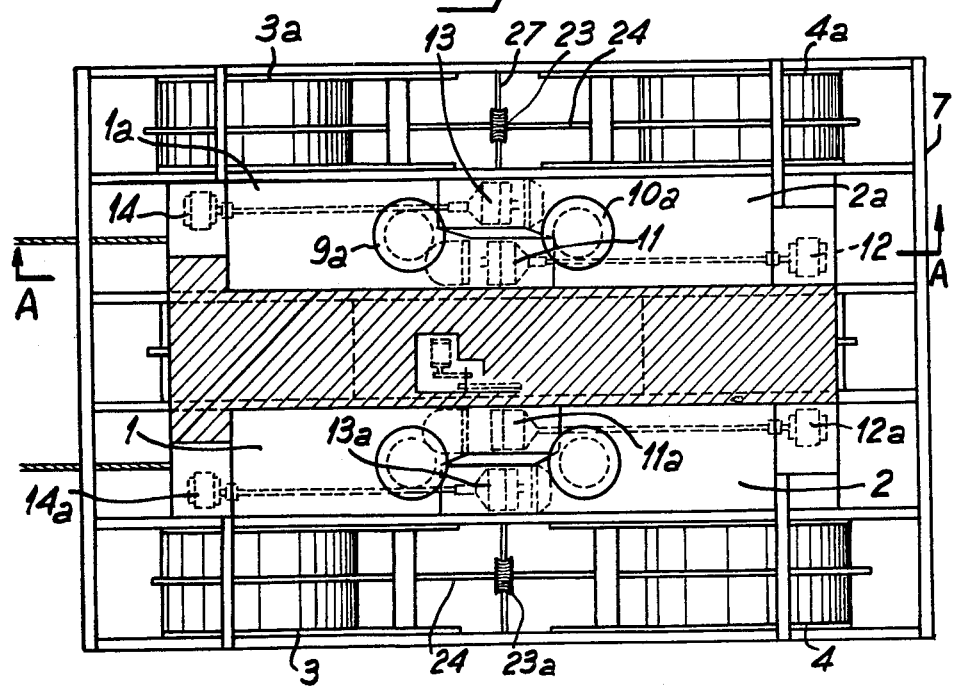
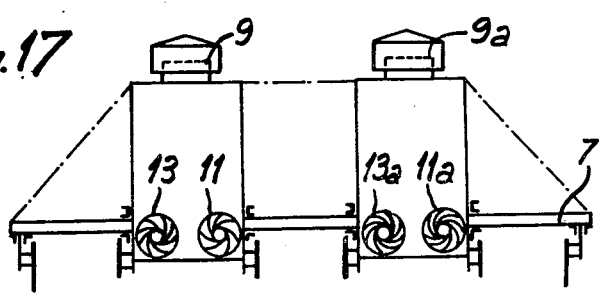

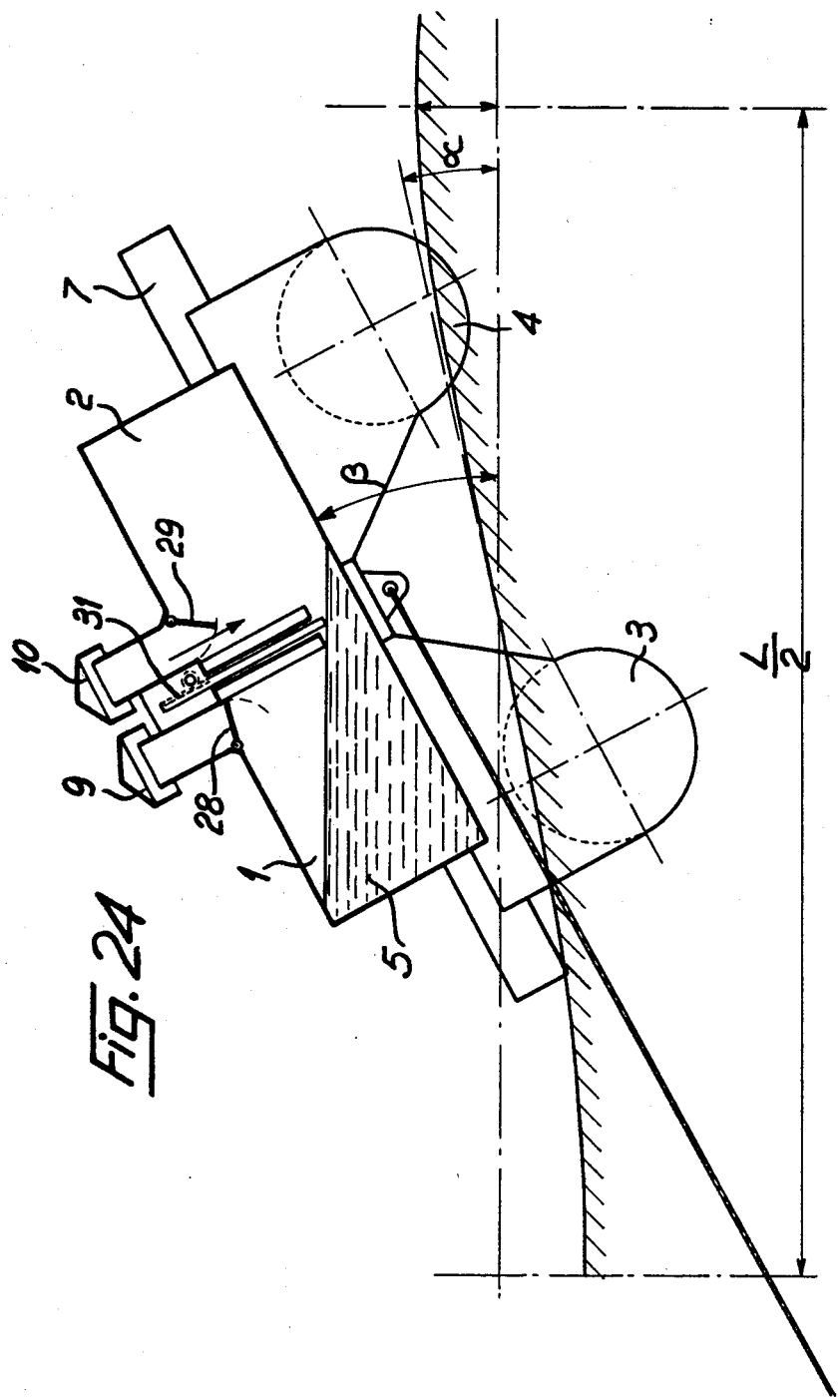

PROCESS AND APPARATUS FOR HARNESSING THE ENERGY OF THE SWELL

This invention relates to a process for harnessing the energy of the natural movements of a liquid mass, especially the movements of the sea, and in particular of the swell, and an apparatus for implementing the said process.

It is known that different movements stir the surface of the sea constantly, these movements being due to the interaction of the lunar attraction, winds, and the contours of the submarine terrain. These different factors find expression in the currents of the swell, waves and tides. The subject of the present invention is a process for harnessing the energy from the swell, the undulatory movement which stirs the sea in its depth without causing waves to break. It is known that the swell generally has an average wave length of 100 meters for amplitudes usually varying between 0 and 20 meters.

Various attempts have already been made to harness the energy of the movements of the sea, whether by exploiting the power of the tides (tidal station), the waves and/or of the swell. The majority of solutions that have been proposed necessitate fixed installations of a very high cost price which makes the price of the energy obtained uncompetitive compared with that from other sources. In addition, in the known processes and apparatuses, the energy of the sea is captured directly, the sea-water itself acting as the fluid enabling mechanical elements coupled to an electric generator, of the dynamo or alternator type, to be set rotating. It is well known that sea-water is very corrosive, and this poses technological problems, which, when they can be resolved, considerably increase the cost price.

The aim of the present invention is to mitigate the disadvantages of known processes and apparatus, and has as its object a process enabling electrical energy to be generated using the movements of the swell, whilst eliminating any pollution of the seas and the atmosphere. A second object of the invention is an apparatus, the building and installtion expenses of which are relatively low compared with the investments necessitated by fixed installations.

The fundamental concept of the invention consists in converting in a first stage the kinetic energy of the swell into kinetic and potential energy of an auxiliary liquid, then in using this energy to cause a mechnical element coupled to a generator of electric current to rotate.

According to the present invention, the process of harnessing the energy of natural movements of a liquid mass, especially the movements of the sea and in particular of the swell, in the form of electrical energy is characterised in that it consists in guiding the said natural movements to cause the reciprocating transference of an auxiliary liquid between two compartments of a vessel floating on the said liquid mass, and in harnessing by any suitable means the energy developed by the said reciprocating transference of the said auxiliary liquid.

According to another characteristic feature of the invention, the above-mentioned process is characterised in that the natural movements of the said liquid mass cause a reciprocating inclination of the said vessel which is greater than, and in particular between two and three times greater than, the natural inclination of the said natural movements, and thus increases in the same proportions, the energy developed by the said reciprocating transference.

The invention requires at least one floating vessel, which enables it to be independent of the (proximity of the) earth. It may thus find interesting application in the supply of energy not only to terrestrial stations, but also to marine research stations (off-shore stations) or to artificial islands.

Figure 11:
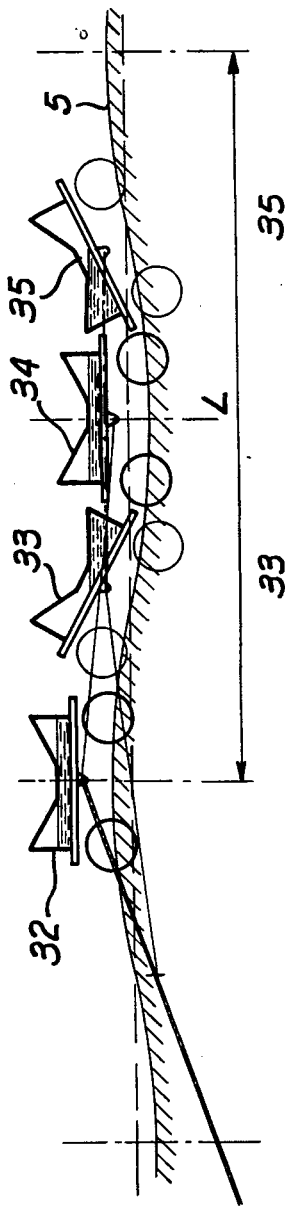
Figure 12:
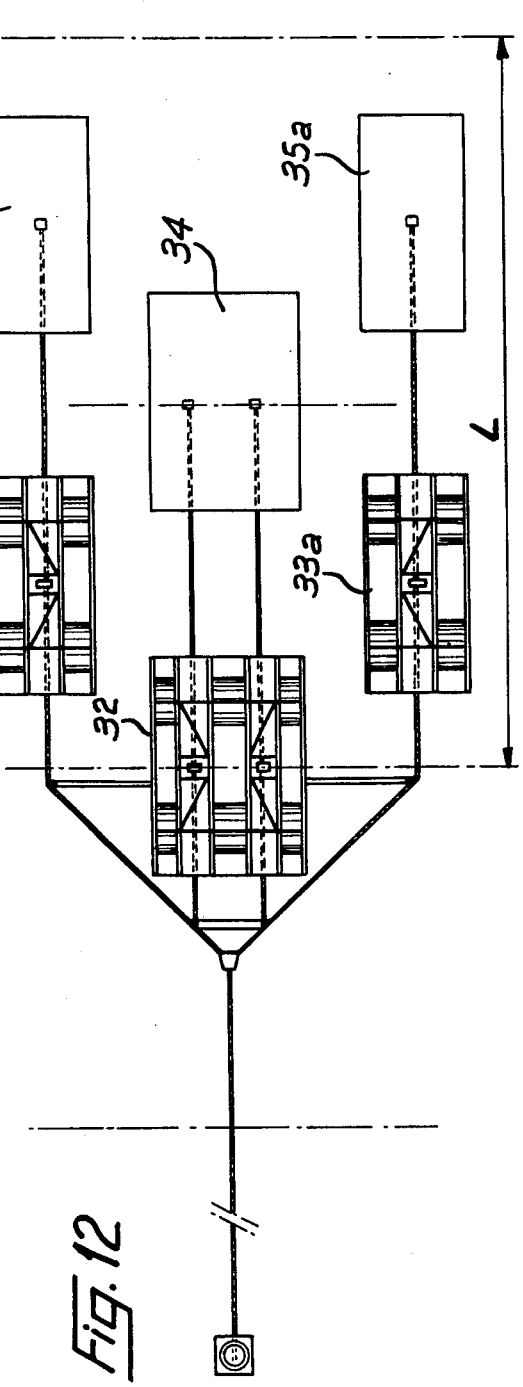
Figure 13:
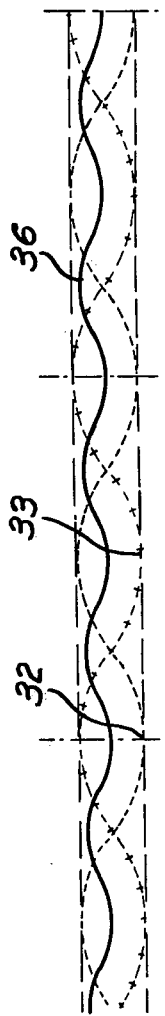
Figure 18:
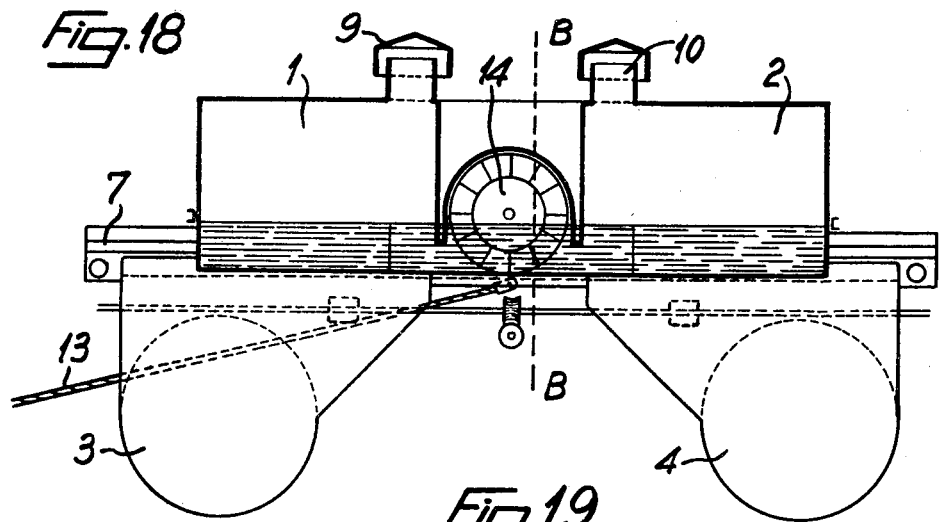
Figure 19:
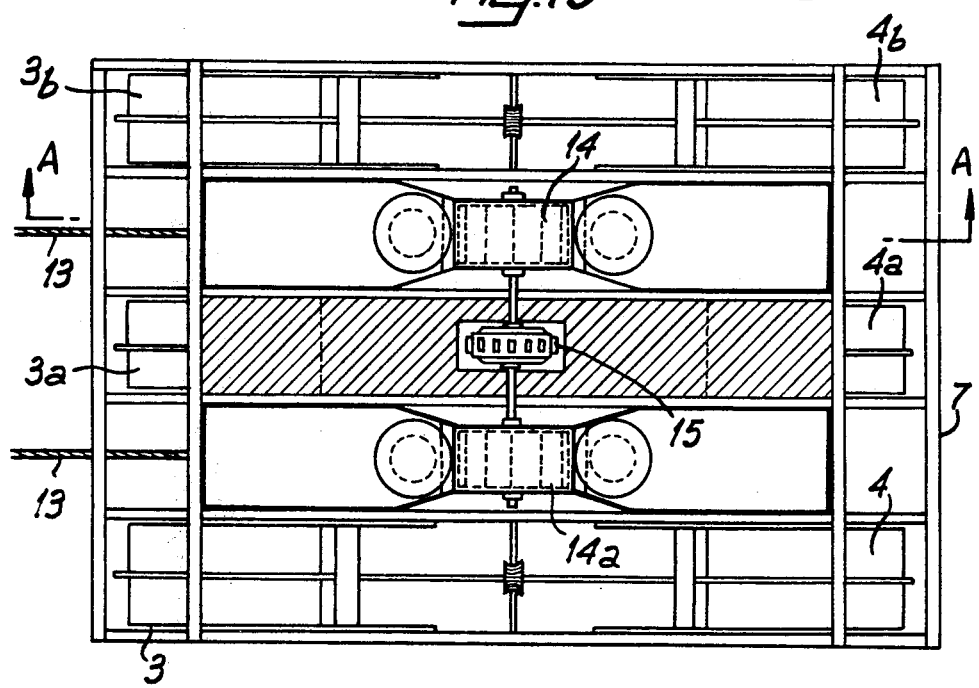
Figure 20:
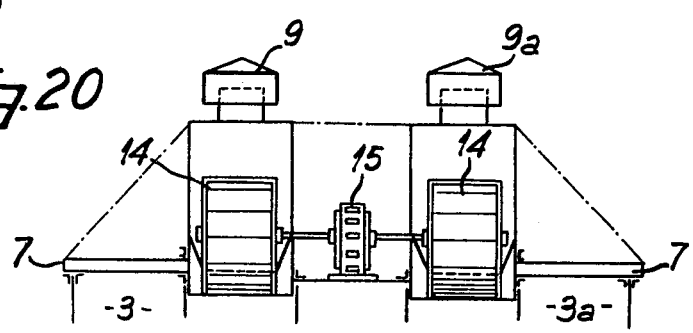
Figure 21:
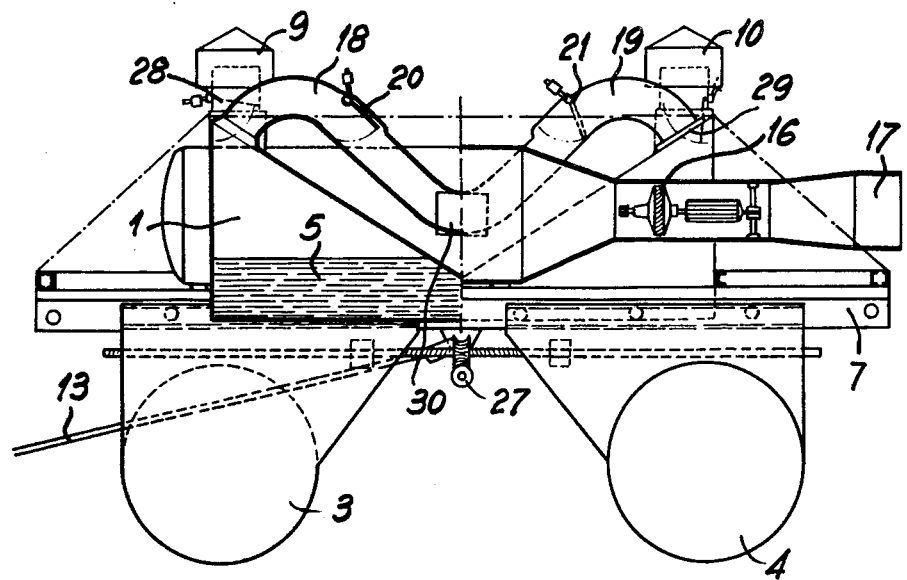
Figure 22:
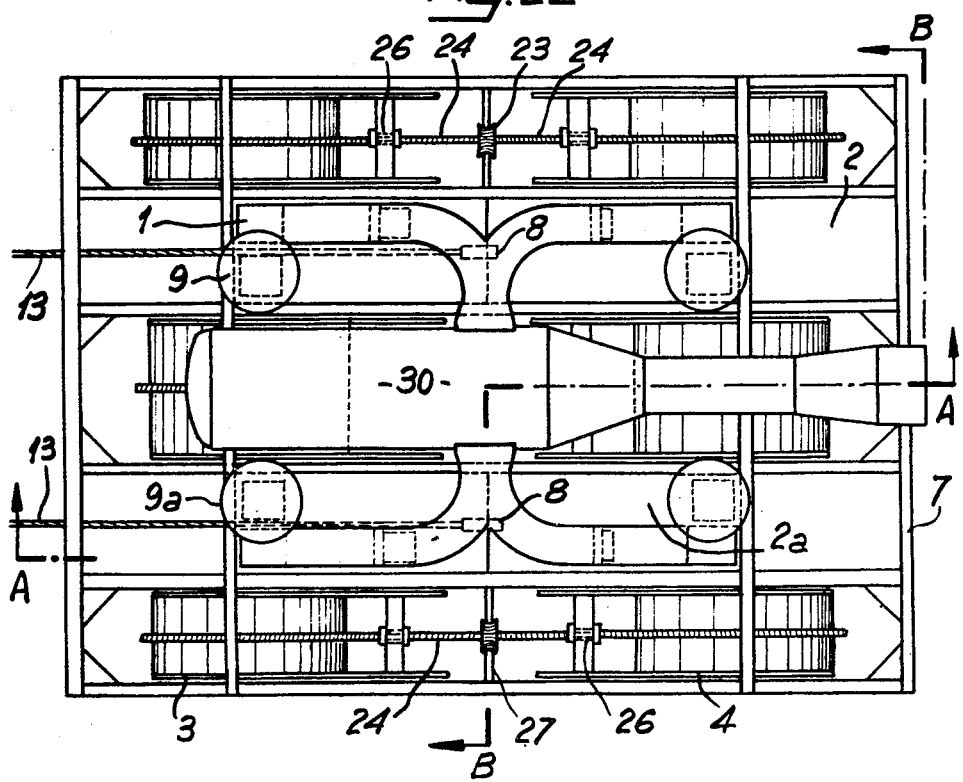
Figure 23:
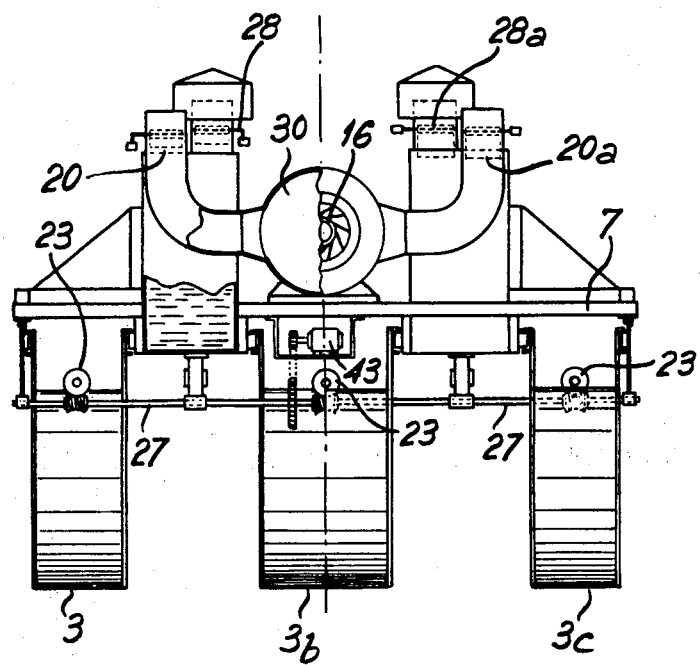

Other features and advantages of the invention will emerge during the description which will follow of embodiments, referring to the figures which illustrate:

in FIGS. 1 to 9, sketches showing the movement of the auxiliary liquid under the influence of the movements of the swell;

in FIG. 10, the sketch of a floating vessel;

in FIG. 11, a sketch showing the positions, at a given instant, of vessels connected in series;

in FIG. 12, a plan view of an assembly of vessels;

in FIG. 13, the diagram of the energy obtained by a group, such as that illustrated in FIG. 12, under the influence of the movement of the swell;

in FIG. 14, a grouping of several assemblies of vessels such as that illustrated in FIG. 12;

in FIG. 15, a section, along the line A—A of FIG. 16, of a view of a first embodiment of a hydraulic turbine;

in FIG. 16, a plan view of this embodiment;

in FIG. 17, a sectional view, along the line B—B of FIG. 15 of this same device;

in FIG. 18, a sectional view, along the line A—A of FIG. 19, of a second embodiment, in FIG. 19, a second embodiment in which the driving element comprises a bucket wheel;

in FIG. 20, an end view of this same device;

in FIG. 21, a sectional view along the line A—A of FIG. 22 of a third embodiment making use of an air turbine;

in FIG. 22, a plan view of this embodiment;

in FIG. 23, an end view of the same embodiment;

in FIG. 24, a floating vessel equipped with a device for regulating the transference of the auxiliary liquid.

The present invention relates to floating tanks or rafts enabling, by their equipment, electrical energy to be generated by using at sea the undulatory movements of the swell. Each floating tank or raft comprises at least one pair of compartments positioned during operation along the direction of propagation of the swell on a framework unit, the buoyancy of which is ensured by pairs of cylindrical floats, the dimensions of which are calculated such that the raft can incline at a maximum angle for a given height of the swell. In FIGS. 1 to 10, only two floats are seen in profile, but it is obvious that for stability it is preferable to use at least two pairs of floats to support the framework.

FIGS. 1 to 9 show very schematically the movements of the raft and the vessel during a cycle of the swell. In these figures, it is apparent that the vessel consists of two compartments 1 and 2, separated by a dividing wall 6. The vessel is supported by substructure 7 resting on the floats 3 and 4 respectively. The surface of the sea is denoted by the reference S and the mean level thereof by the reference 0. The raft 7 is moored as described below by a cable 13 secured to the point 8.

Figure 2:
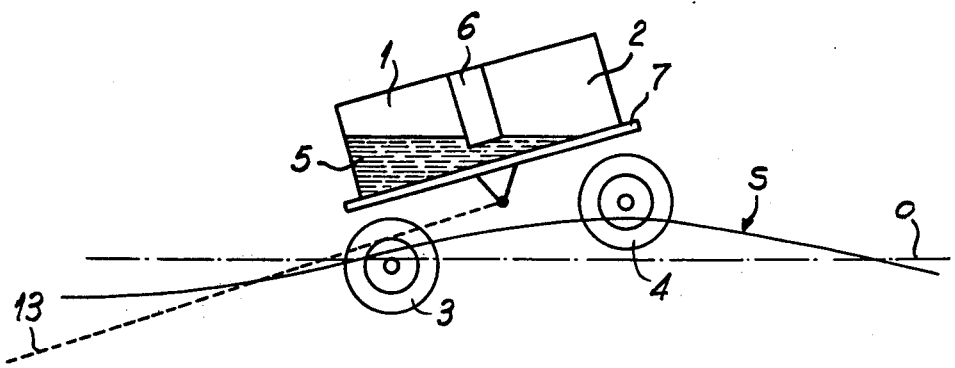
Figure 3:
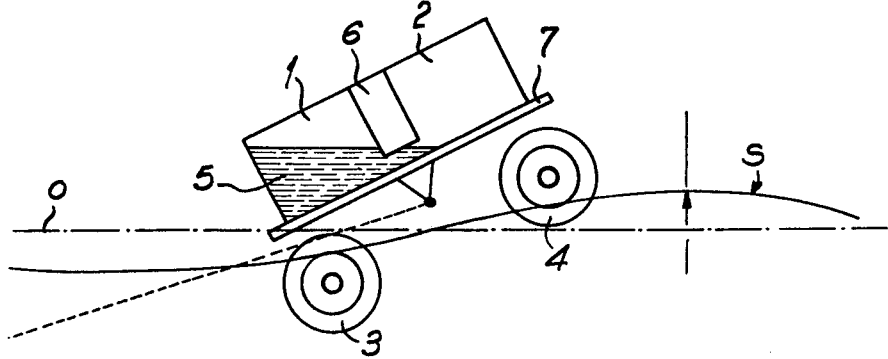
Figure 4:
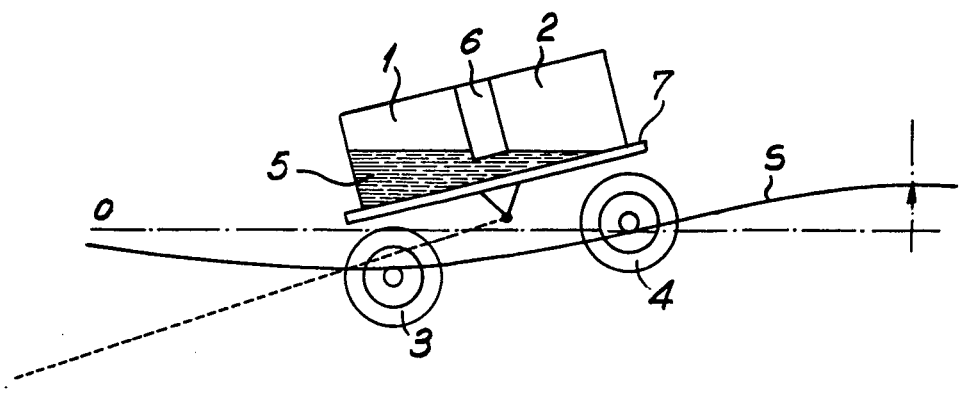
Figure 5:
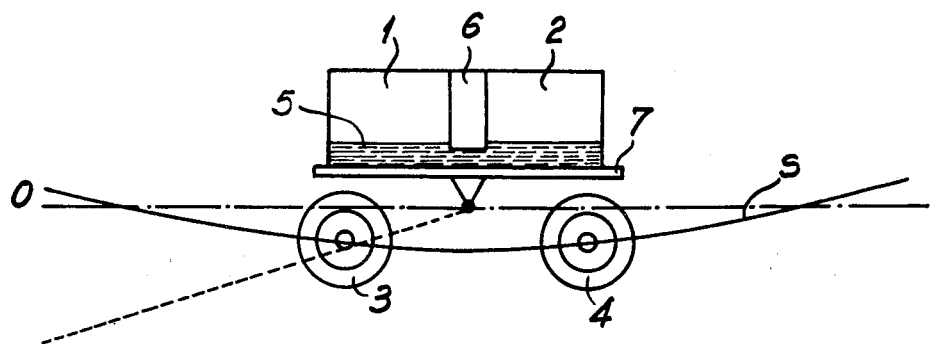
Figure 6:
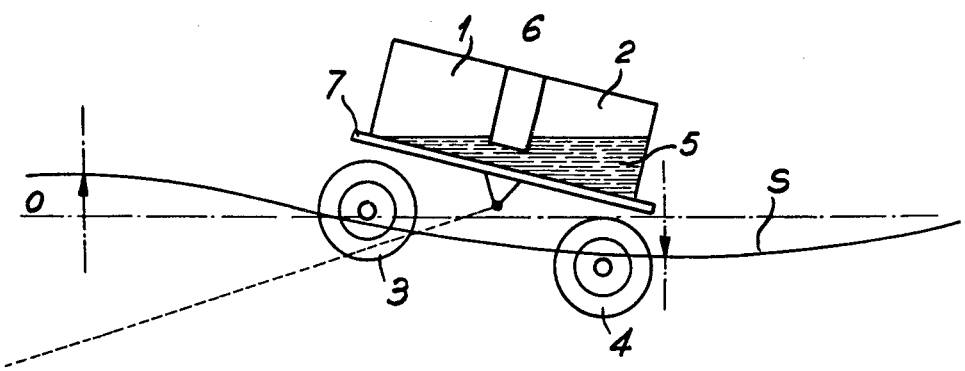

In FIG. 1, the raft is at the summit of the wave formed by the swell. The two floats being of equal diameter, the auxiliary liquid 5 in the vessel is equally distributed between the compartments 1 and 2. In FIG. 2, the front or crest of the swell has advanced such that the float 4 is higher relative to the level 0 than float 3. During this movement, the compartment 2 empties whereas compartment 1 fills up. The movement of the auxiliary liquid is harnessed by means that will be described below, and is transformed into electrical energy. In FIG. 3, as the crest of the swell S has advanced further, compartment 2 is completely empty, all the auxiliary liquid 5 being contained in compartment 1. As the movement of the swell continues, the inverse movement occurs, that is to say, the compartment 1 empties whereas the compartment 2 fills up. The means for converting the kinetic energy of the liquid into electrical energy are placed beneath the dividing wall 6. In FIG. 5, the raft 7 is again in a horizontal position, the floats 3 and 4 occupying a symmetrical position relative to the trough of the wave of the swell. This trough travels towards the right and the configuration shown in FIG. 6 is obtained, in which the float 4 is lower than the float 3 and thus causes the auxiliary liquid 5 to pass from compartment 1 to compartment 2. With the travel of the swell, compartment 2 fills up again whereas compartment 1 empties completely as shown in FIG. 7. As the trough advances to the right hand side of the Figure, compartment 2 starts to empty and compartment 1 starts to fill up, until the configuration shown in FIG. 9 is obtained, this being identical to that shown in FIG. 1. The movement of the auxiliary liquid 5 thus starts again indefinitely.

FIG. 10 enables the manner in which the forces involved in the process interact to be explained. Letting L be the wave length of the swell, which is of the order of 100 meters but which may vary quite substantially about this value, as a function of the winds and the submarine terrain, and letting H be the amplitude or height of movement of the surface of the sea relative to its mean level, C the speed or velocity of travel of the profile and T the cycle of the oscillation (time taken for two successive crests to pass the same point), it is known that these different parameters are linked to a large extent by the formulae:

$$T = L/C$$

$$L = gT^2/2\pi$$

$$C = gL/2\pi$$

(g being the acceleration of gravity).

As shown in FIG. 10, the principle load on the raft is represented by the means of liquid contained in the reservoirs, and in the example illustrated in FIG. 10, in the reservoir 1. To the centr of gravity of this mass, denoted by G1, there is applied the weight M1 which is balanced by the force F1, the Archimedean upthrust, the value of which is equal to the weight of the volume of water displaced by the submersion of the float 3. In contrast, the float 4 only has to counterbalance, with the upthrust F2, the remainder of the weight of th raft M2 applied substantially to the geometric centre thereof. The result is that float 3 is submerged much deeper than float 4, which enables an angle $\beta$ to be obtained which is two to three times greater than the natural slope $\alpha$ of the swell with respect to the horizontal, that is to say, the difference in level between the two compartments is increased, which enables the kinetic and potential energy of the auxili liquid to be increased. By using floats which are large relative to th raft, a level or step-up effect is achieved which is reflected in the energy harnessed. It should be noted that in principle, the centre of gravity of the mass of auxiliary liquid must lie, during these movement between the two centres of motion (centre of gravity of the portion not submerged of the floats), or must be spaced therefrom only by an amount which is of the same magnitude as the empty weight of the raft in order to avoid any possibility of the raft tipping over.

The need to obtain a maximum efficiency of the oscillating movement of the raft has resulted in the floats 3 and 4 being joined such that a distance between them is allowed; this distance should be about 0.25 L, L still being the wave length of the swell. That is to say, for a swell of 100 meters, the distance between the floats should be about 25 meters.

FIGS. 15, 16 and 17 illustrate a first embodiment of a practical device for generating electricity according to the invention. FIG. 15 is a vertical section along the line A—A of FIG. 16 of a raft or floating tank, the said floating tank being in a horizontal position. The elements previously mentioned are again present, i.e., the compartments 1 and 2, the dividing wall 6, and two front floats 3a and 4a. The mooring cable 13 is secured at a point 8 on the framework 7, such that the raft can swing relative to the cable.

Compartment 1a communicates with the open air via a vent 9a, whilst compartment 2a communicates with the open air via a vent 10a. The communication with the atmosphere is not, however, an obligatory feature of the invention, and in certain cases compartments completely sealed from the atmosphere may be used. One of the advantages of the invention is that the auxiliary liquid 5 can be a non-corrosive liquid that is inert towards metal members and which has a density greater than that of water. In other respects, given that with this arrangement there is no friction, with the exception of the turbine, the life of the arrangement is particularly long.

In the embodiment shown in FIG. 15, a turbine 11 drives a generator 12 of the alternator type, for example. This generator is preferably positioned on the outside of the floating tank, as shown in FIG. 15. However, it is known that hydraulic turbines give a maximum efficiency in one direction only, and for this purpose there has been provided in each passage for the liquid defined by the dividing wall 6 and the compartments 1 and 2 respectively, two parallel passages, wherein it is possible to seal each of these passages, as a function of the direction in which the liquid is circulating, by a flap valve 22. As more clearly apparent in FIG. 16, the apparatus for generating electricity illustrated is a double apparatus, that is to say, it comprises two pairs of front floats 3 and 3a, and two pairs of rear floats 4 and 4a, two lots of two compartments 1 and 1a, and 2 and 2a, each unit of two compartments communicating through two turbines 11 and 11a and 13 and 13a (see FIG. 17). The use of this double raft enables an improved stability to be obtained with respect to the waves which may occur cross-wise relative to the raft in a violent manner whereas the swell only changes its orientation very slowly, each change in the orientation being followed by the apparatus. It will be noted in FIG. 16 that the floats 3, 4, 3a and 4a able to slide inside the framework 7 under the action of a pinion 23 driving two endless screws 24 which cooperate with the nuts 25 and 26 which are integral with the floats. By acting on a shaft 27, for example by remote control, it is possible to move the floats apart or bring them closer together as a function of the wave length of the swell, taking into account the fact that the efficiency of the arrangement is at a maximum when the distance between the axes of the floats is substantially equal to one quarter of the wave length of the swell. Although in the figures a drive system for adjusting the distance between the axes of the floats by means of pinions and endless screws has been illustrated, it is obvious that this displacement can be obtained using hydraulic jacks controlled by a central station. The interconnection of the compartments 1 and 2 is effected in practice by two passages of large diameter, and of the order of about 2.20 to 2.50 meters for example. The turbines 11 and 13 are turbines having a very large flow passage, capable of handling a rate of flow of 50 to 100 m$^3$ per second. As previously mentioned, between the two compartments linked by the passages, the position of the flap valve 22 allows the flow of liquid in one direction and closes the passage to movement in the other direction, which avoids the use of double-acting turbines of poor efficiency. The volume of the compartments is of the order of 80 m$^3$ per linear meter in breadth, and the difference in level of the two reservoirs may attain 6 to 7 meters, i.e., a mean difference in level of 3 meters. Under these conditions the time taken for liquid to pass from one reservoir into the other is one half of the cycle of the swell, i.e., substantially from 5 to 10 seconds, which results in a rate of flow of about 100 m$^3$ per second. Under these conditions the electrical energy available at the output of the generator is considerable. With the above data, the diameter of the floats is about 10 meters.

FIGS. 18, 19 and 20 illustrate a second embodiment in which the hydraulic turbines 11 and 13 have been replaced by paddle wheels 14. In this embodiment which is illustrated, the raft consists of six floats 3, 3a, 3b and 4, 4a, 4b. The system of spacing the floats is the same as described and illustrated with reference to FIG. 16, and will not be repeated. In the embodiment shown in these three Figures, the energy of the liquid flowing from one compartment to the other is harnessed by a paddle wheel. In FIG. 19 there are two paddle wheel 14 and 14a, the axles of which are integral with the axle of an electrical generator 15 capable of rotating in two directions. Although the efficiency of this second embodiment is less than the efficiency of the hydraulic turbines described in the first embodiment, it is nevertheless interesting, taking into account its particularly simple operation and the much lower cost of maintenance.

FIGS. 21, 22 and 23 illustrate, in the same manner as the previous figures, i.e., in elevation, in plan view and in profile, a third embodiment using a compressible auxiliary fluid, for example air. In this embodiment the driving member, i.e., the element driving the generator, is a turbo-fan 16 positioned in a blast 17, and the axle of which is integral with the axle of the generator. In this embodiment, the energy of the auxiliary liquid is not used directly to set a mechanical drive member rotating, but serves to compress an auxiliary fluid such as air; as this fluid escapes, it drives the turbo-fan and thereby produces the desired mechanical energy. The flotation means in this particular case consist of three pairs of floats, the central floats being twice the width of the lateral floats. There is thus produced a catamaran assembly, and experience has shown that it was particularly stable, even in heavy seas. The arrangement shown in FIG. 22 consits, as before, of two pairs of compartments 1, 2, 1a and 2a, from the upper end of each of the siad compartments there extend passages 18 from the compartment 1 and passages 19 from the compartment 2. As before, these compartments are provided with vents 9 and 10 having flap valves 28 and 29 enabling the particular compartment to be cut off from the outside at the which it is subjected to pressure. When flap valve 28 is closed and as the auxiliary liquid 5 is filling compartment 1, the air at the top of this compartment is compressed and is evacuated through the passage 18 when the flap valve 20 is open. When the raft slopes in the opposite direction, the air in compartment 2 is compressed. It opens flap valve 21 and enters chamber 30 which communicates with the blast pipe 17. The volumes of air compressed in each compartment are equal. In this embodiment no metal element is in contact with the auxiliary liquid, which enables the electrical elements to be simplified and a relatively constant operation to be obtained. The four passages open out into a common chamber 30 acting as a store of compressed air. Advantageously, the flap valves 20, 20a, 28 and 28a are arranged to open automatically under the influence of a slight reduced pressure and come to rest against a fixed element as soon as a slight overpressure is produced. FIG. 23, which is a section along the line B—B of FIG. 22, illustrates the drive system for spacing the floats, this system enabling the interaxial lengths of the said floats to be adjusted. In the example shown, this system consists of a motor 43 driving a shaft 27 via the intermediary of a belt, the shaft 27 engaging with pinions 23 which are themselves integral with the endless screw 24. As in the preceding embodiment, this drive system can be replaced by an assembly of pneumatic or hydraulic jacks.

Although not shown in the Figures, it goes without saying that all the mechanical elements described can be sheathed to protect them from the oxidising action of spray.

In the embodiment just described (conversion of a pneumatic pressure into electrical energy via the intermediary of a turbo-fan), the auxiliary liquid does not come into contact during its transference from one vessel to another with any mechanical elements which brake the said transference. It is therefore necessary, as a function of the peculiarties of the swell, to be able to control the duration of this transference and this can be achieved by introducing into the partition 6 separating the two compartments 1 and 2, a valve 31 which can be remote controlled (see FIG. 24). The height of the moving element of the valve enables the rate of flow of the auxiliary liquid between the two compartments to be regulated.

Since the dimensions of an arrangement such as that just described are inevitably limited, it is possible to join several rafts intended to generate jointly, and preferably in synchronism, the desired electrical energy. FIGS. 11 and 12 illustrate, in side view and in plan view respectively, such an assembly. According to a feature of the invention, all the rafts are joined by cables and moored at a fixed point 37, such that the electric power station thus formed can turn the swell about the point 37. It is in fact known that the change in orientation of the swell, which is due to a natural phenomenon, is always relatively slow. In FIGS. 11 and 12 a first raft 32 consists of two pairs of compartments, this raft being aligned with the point 37, whilst the following rafts 33 and 33a have single compartments. This assembly can be followed by an identical assembly consisting of a double arrangement 34 followed by two single arrangements 35 and 35a. In dependence on the relative positions of the raft 32 on the one hand and the rafts 33, 33a on the other hand, it is possible to obtain the production of two electrical voltages of opposite phase, as shown in FIG. 13. The sum of the two voltages enables an electrical voltage to be tapped at the output of the arrangement such as that indicated schematically by the reference 36 in FIG. 13. As already mentioned, the wave length of the swell is liable to change with time and to obtain a constant electrical voltage, such as that shown in FIG. 13, the cables joining the rafts together are advantageously mounted over winches which can be remote controlled such that the distance between a raft 32 and the rafts 33 is substantially equal to one quarter of the length of the swell.

The double rafts 32 and 34 are located at the crest and the trough of the swell at the moment of their maximum rate of flow, during which the single rafts 33 and 35 are in a position in which the rate of flow is minimal. Thus, thus the forces transmitted to the generators vary from zero to their maximum value and by superimposing one or the other during each passage of an undulation of the swell one obtains a mean curve located between 50 and 75% of the maximum theoretical power (reference 36, FIG. 13).

In FIG. 14, there is schematically illustrated a marine station consisting of three groups, such as 40, 41 and 42 above, moored to fixed points 37, 38 and 39 respectively. The direction of travel of the swell is symbolised by the arrow F. In this Figure it will be seen that when the swell turns, the groups 40, 41 and 42 cannot come into contact with each other.

The arrangements just described require minimum maintenance, but it is obvious, of course, that it is necessary to make various adjustments as a function of the variation in the parameters of the swell. Given that it is impossible in practice to carry out these adjustments by boarding the said rafts, taking into account the desired amplitude of the movements of the rafts, these adjustments can be affected by remote control from a terrestrial station which has been informed of the meteorological conditions. It is likewise possible to control the different adjustments entirely by using an electrical circuit, which acts on the spacing of the floats relative to one another, the spacing of the rafts, possibly the height of the opening of the valve separating the two compartments, etc. . . such that the electrical voltage generated by the station is optimised.

Although the present invention has been described using the swell of the sea as an example, it is obvious that it can be applied "mutatis mutandis" whenever there are natural cyclic movements of a mass of liquid present.

It goes without saying that modifications may be made to the embodiments just described, especially by substituting equivalent technical means, without leaving the scope of the present invention.

What is claimed is:

1. An apparatus for harnessing the energy of the swell, the apparatus including:
   a vessel suitable to be supported above the surface of the sea, and divided into two compartments having lower portions in fluid communication with one anotherfor receiving an auxiliary liquid;
   means for translating into electrical energy the energy developed by reciprocating motion of said auxiliary liquid caused by the vessel following the natural movements of the sea, said reciprocating motion of said auxiliary liquid which is translated into electrical energy being reciprocating transfer of said auxiliary liquid between said two compartments;
   said translating means comprising an electrical generator and at least two turbines enclosed in parallel passages providing said fluid communication between said lower portions of said compartments, said turbines being operatively connected to the generator and operated by auxiliary liquid during reciprocating transfer thereof in both directions; and
   means for closing a first of said passages and opening a second of said passages during transfer of said auxiliary liquid in one direction and for opening the first of said passages and closing a second of said passages during transfer of the auxiliary liquid in the opposite direction.

2. A floating power station for harnessing the energy of the swell, the station including:
   a plurality of vessels supported above the sea surface by the floating structures of the vessels, each vessel having at least one compartment for receiving an auxiliary liquid;
   a mooring;
   a plurality of cables connecting the vessels to the mooring, said cables being wound remote controlled winches enabling the relative positions of the vessels to be adjusted according to the wavelength of the swell; and
   means for translating into electrical energy the energy developed by reciprocating motion of said auxiliary liquid caused by the vessel following the movement of the swell.

3. A floating powerstation according to claim 2, wherein each vessel has at least two compartments.

4. A process for harnessing the energy of the swell, the process including the following steps:
   providing a vessel supported above the surface of the sea by means of cylindrical floats supporting said vessel, the vessel having at least two compartments containing auxiliary liquid;
   allowing the vessel to follow the swell movements thereby causing reciprocating motion of said auxiliary liquid from one compartment to the other through two passage ways; and
   disposing at least one turbine in fluid communication with at least one of said passage ways and mechanically coupled with an electric generator for converting the energy developed by the reciprocating motion of said auxiliary liquid into electrical energy.

5. An apparatus for harnessing the energy of the swell, the apparatus including:
   a vessel suitable to be supported above the surface of the sea by the vessel floating structure, and divided into two compartments having lower portions communicating with one another for receiving an auxiliary liquid;
   means for translating into electrical energy the energy developed by reciprocating motion of said auxiliary liquid caused by the vessel following the natural movements of the sea, said reciprocating motion of said auxiliary liquid which is translated into electrical energy being reciprocating transfer of said auxiliary liquid between said two compartments;
   at least one pair of cylindrical floats supporting the vessel, the axes of the floats being substantially perpendicular to the direction of propagation of said natural movements, said floats being slidably mounted on the vessel; and means for adjusting the position of the floats.

6. An apparatus according to claim 5 wherein said adjusting means comprises remotely controlled jacks.

7. An apparatus for harnessing the energy of the swell, the apparatus including a vessel suitable to be supported above the surface of the sea by the vessel floating structure and having at least two compartments for receiving an auxiliary liquid and means for translating into electrical energy the energy developed by reciprocating motion of said auxiliary liquid caused by the vessel following the natural movement of the sea, said vessel being borne by cylindrical floats, and floats being slidably mounted on the vessel, and further including means for adjusting the postion of the floats.

8. An apparatus according to claim 7, wherein said adjusting means comprises remotely controlled jacks.

9. An apparatus to claim 7, wherein at least two turbines are enclosed in parallel passage ways providing said fluid communication between said compartments, and further including means for closing a first of said passages and opening a second of said passages during transfer of said auxiliary liquid in one direction and for opening the first of said passages and closing the second of said passages during transfer of the auxiliary liquid in the opposite direction.

10. An apparatus according to claim 7 further including a cable mooring the vessel to a fixed point at the bottom of the sea, the angle of the cable being less than 30 degrees with respect to the horizontal.

11. An apparatus according to claim 7 wherein the distance between the centres of said floats is equal to one quarter of the wavelength of said natural movements.

12. An apparatus according to claim 7 wherein said translating means comprises an electrical generator and at least one turbine operatively connected to the generator and located between the two compartments and operated by auxiliary liquid during its reciprocating transfer in both directions.

13. An apparatus according to claim 12 in which said closing and opening means comprises a flap value in each passage.

14. An apparatus according to claim 7 wherein said translating means comprises at least one paddle wheel located between the two compartments and means for converting the mechanical energy of the paddle wheel into electrical energy.

15. An apparatus according to claim 7 wherein said translation means comprises an auxiliary fluid located in the upper portions of the two compartments and means in fluid communication with the upper portions of the two compartments for converting energy transmitted to said auxiliary fluid by said reciprocating transfer of said auxiliary liquid into electrical energy.

16. An apparatus according to claim 15 further including flap valves in the paths of fluid communication between said converting means and each of the two compartments, whereby filling and emptying of auxiliary fluid in a compartment occurs only during emptying and filling respectively of that compartment.

17. An apparatus according to claim 15 wherein said converting means comprises an electrical generator and a turbo-fan driven by said auxiliary fluid and mechanically coupled to the generator.

18. An apparatus according to claim 7 including regulating means for adjusting the extent of fluid communication between the lower portion of the compartments thereby regulating said reciprocating transfer of said auxiliary liquid between said compartments.

19. An apparatus according to claim 18 wherein said regulating means is a valve.

* * * * *

UNITED STATES PATENT AND TRADEMARK OFFICE
CERTIFICATE OF CORRECTION

PATENT NO. : 4,207,739
DATED : June 17, 1980
INVENTOR(S) : Bruno Dominique Scarpi It is certified that error appears in the above-identified patent and that said Letters Patent are hereby corrected as shown below:

In the claims:

Claim 13, line 1 change 12 to --1--.

Signed and Sealed this

Twenty-eighth Day of October 1980

[SEAL]

Attest:

SIDNEY A. DIAMOND

Attesting Officer

Commissioner of Patents and Trademarks